United States Patent [19]
Kobayashi

[11] Patent Number: 4,594,706
[45] Date of Patent: Jun. 10, 1986

[54] PACKET COMMUNICATION SYSTEMS

[75] Inventor: Kazutomo Kobayashi, Tokyo, Japan

[73] Assignee: NEC Corporation, Tokyo, Japan

[21] Appl. No.: 602,572

[22] Filed: Apr. 20, 1984

[30] Foreign Application Priority Data

| Apr. 22, 1983 [JP] | Japan | 58/71054 |
| Apr. 25, 1983 [JP] | Japan | 58/72381 |
| Apr. 25, 1983 [JP] | Japan | 58/72382 |

[51] Int. Cl.⁴ .............................................. H04J 3/06
[52] U.S. Cl. ...................................... 370/89; 370/104
[58] Field of Search ...................... 370/85, 93, 94, 95, 370/104, 89

[56] References Cited

U.S. PATENT DOCUMENTS

| 4,154,983 | 5/1979 | Pedersen | 370/89 |
| 4,322,845 | 3/1982 | Fennel, Jr. et al. | 370/104 |
| 4,482,999 | 11/1984 | Janson et al. | 370/89 |
| 4,491,947 | 1/1985 | Frank | 370/104 |
| 4,504,946 | 3/1985 | Raychaudhuri | 370/95 |

OTHER PUBLICATIONS

"Priority Based Packet Reservation Demand Assignmemt TDMA System", *Electronics and Communications in Japan*, vol. 66-B, No. 4, 1983.
"Demand Assignment TDMA System for Integrated Digital Satellite Communication Experiment", *Japan Telecomm. Review.*, vol. 23, No. 1, 1981.

*Primary Examiner*—Douglas W. Olms
*Assistant Examiner*—Kenneth I. Rokoff
*Attorney, Agent, or Firm*—Sughrue, Mion, Zinn, Macpeak and Seas

[57] ABSTRACT

In a packet communication system of a multiaccess type in which a single communication medium is used commonly and divided into a plurality of channels, respective users observe states of the channels and the probability of packet transmission to respective channels is controlled in accordance with observed information, respective users are assigned parameters corresponding to respective channels and the probability of packet transmission onto the channels is controlled according to the parameters, a dummy packet is continuously transmitted for a predetermined time at in channels having low utilization factors, for data requiring immediate transmission. In a modification, a setup packet is sent for data requiring immediate transmission. All the users determine whether the received packet is the setup packet and the set the stored parameters. Accordingly, in another modification, a setup packet is transmitted for data requiring immediate transmission and a dummy packet is continuously transmitted in a channel for which the origination setting packet is successful.

6 Claims, 24 Drawing Figures

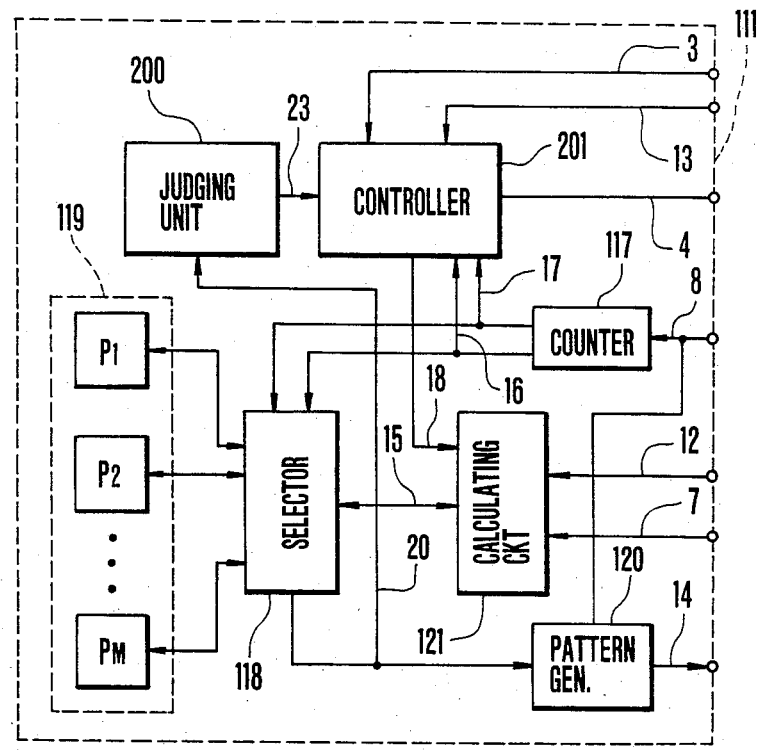
F I G.18
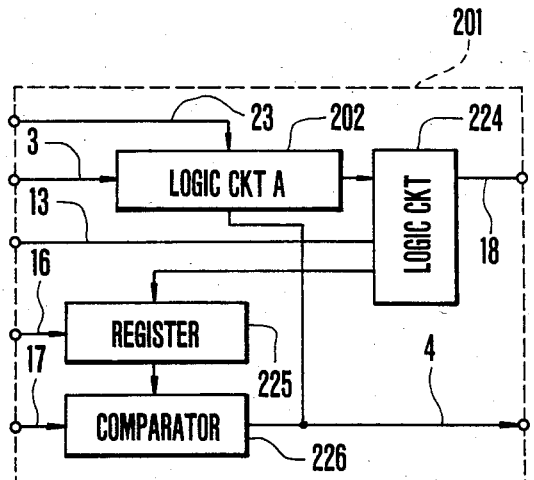
F I G.19

PACKET COMMUNICATION SYSTEMS

BACKGROUND OF THE INVENTION

This invention relates to a packet communication system of a multiaccess type wherein a single communication medium is used in common by a plurality of users for effecting packet communication.

A TDMA (time division multiple access) system and an ALOHA system have been well known as the packet communication system which uses a satellite or the like as a single communication medium as shown in FIG. 1 of the accompanying drawing. According to the former system, time is divided into a plurality of time slots, each for transmission of one packet. Thus, where there are N (a positive integer) users, N time slots are made to correspond to one frame and each time slot in one frame is fixedly assigned to each user. This system is advantageous when the number of users is small and the traffic of each user is large, however when the number of users is large and the traffic of each user is small, the utilization efficiency of the channel decreases greatly, thus greatly increasing the average delay time. Furthermore, this system is not advantageous where the traffic among users is not uniform. The latter ALOHA system includes a pure ALOHA system developed several years ago and a slotted ALOHA system developed later. The invention will be described in connection with the slot ALOHA system. As shown in FIG. 2, time is divided into a plurality of time slots in the same manner as the TDMA system. When a user wants to transmit a packet, he immediately transmits the packet in synchronism with a given time slot. If a number of users transmit packets causing collision of packets at the given time slot, packets are retransmitted at random. This system is advantageous for a case where the number of users is large and the traffic of respective users is small. However, the maximum throughput of this system is as low as 0.368 with respect to the optimum channel capacity defined as 1.0. Accordingly, where the traffic exceeds this value, the number of collisions increases, thus causing a deadlocked state.

Accordingly, when the number of users is large and the traffic varies in a wide range, neither system described above may be suitable. One option is to selectively use either one of the ALOHA mode or the TDMA mode, according to the traffic. Such option is shown in U.S. patent application Ser. No. 503,264 by the same applicant as the present application entitled "Multiple Access System and Method" and filed on June 10, 1983. When a system of this U.S. patent application is applied in a time domain, it assumes the ALOHA mode when the traffic is small or the TDMA mode when the traffic is large. As shown in FIG. 3, according to this system, a time interval is divided into a plurality of time slots for respective transmission times of one packet so that M slots are contained in one frame and the users would be assigned through parameters that correspond to respective time slots in one frame.

Let us denote a parameter of a user j corresponding to a time slot i by $P_{ij}$, then, when the user j desires transmission inclusive of retransmission at the time slot i, the transmission is made at a probability of $P_{ij}$. If the transmitted packet collides with another packet in the channel, the transmitted packet is delayed in the same manner as the slotted ALOHA system according to a certain distribution for retransmission.

The following is an algorithm for adjusting $P_{ij}$, the basic form thereof being shown as follows:

$$P_{ij}^{T+1} = P_{ij}^T + \alpha \delta_{ij} \quad (1)$$

$\delta_{ij} = 1 \ldots$ where time slot $i$ is empty or a packet transmitted at time slot $i$ is successful
$-1 \ldots$ other cases $\quad (2)$ In the above and T represents time the unit of which is one frame (M slots), $\alpha$ represents a positive small number of less than 1 (one) which is called a correction coefficient. Since a parameter $\{P_{ij}\}$ represents the probability of transmission, the following restriction is assumed in addition to the algorithm described above:

$$\left. \begin{array}{l} \text{When } P_{ij} < 0, P_{ij} = 0 \\ \text{When } P_{ij} > 1, P_{ij} = 1 \end{array} \right\} \quad (3)$$

A low traffic condition will first be considered. Under this condition, the channel is empty in most cases so that the correction is made in a direction for increasing the parameter $P_{ij}$ with the result that $P_{ij}$ becomes 1 under the conditions (3). Under these conditions, an operation identical to that of the conventional slotted ALOHA system can be made because an immediate transmission can be made in response to a transmission request. This state is hereinafter termed an ALOHA mode.

A case of a high traffic will now be considered. In the initial ALOHA mode, all parameters $\{P_{ij}\}$ are once reduced owing to frequent collisions. When the parameters become sufficiently small, a successful packet will appear. Suppose now that a packet sent out to a time slot i from user j is successful, then parameter $P_{ij}$ increases whereas the parameters $P_{ik}$ ($k \neq j$) of other users decrease. Accordingly, the user j has a good chance for transmitting the packet at the time slot i, thus increasing the probability of success of the transmitted packet. As a consequence, the parameter $P_{ij}$ of user j continues to increase until $P_{ij}=1$, while the parameters $P_{ik}$ ($k \neq 1$) of other users continue to decrease until $P_{ik}=0$ ($k \neq j$). When the parameters are determined in this manner, no collision occurs at the time slot i. The parameters of other time slots are determined in the same manner, with the result that a system in which collision is avoided can be realized.

Although the prior art system described above is extremely efficient for a data transmission in which packets arrive in accordance with Poisson distribution and differences in delay are permissible, there arises a problem for voice packets which arrive periodically and requires immediate transmission, because the delay is varried due to the traffic.

SUMMARY OF THE INVENTION

It is an object of this invention to provide packet communication system in which channel assignement is made immediately by a switchable circuit for data requesting periodic and immediate transmission but a random access is made for other channels. This object can be accomplished by dividing a single communication medium into a plurality of channels, by assigning to users parameters corresponding to respectives channels, controlling the quantity of access to the channels in accordance with the parameters and by continuously sending out a dummy packet for a predetermined time to a channel having a low utilization factor for data requiring immediate transmission.

According to another approach, for the data requiring immediate transmission, this object can be accomplished by providing all the users with means for determining whether the received packet is a setup packet and by sending a setup packet.

According to still another approach, for the data requiring immediate transmission, this object can be accomplished by sending a setup packet and then continuously sending out a dummy packet to a channel for which the setup packet is successful.

According to this invention, there is provided a packet communication system of a multiaccess type in which a single communication medium is commonly used and wherein the communication medium is divided into a plurality of channels, respective users observe states of respective channels, and the probability of packet transmission to respective channels is controlled in accordance with observed information, characterized in that there is provided a memory circuit for storing a plurality of parameters corresponding to respective channels; means for transmitting a packet when a transmission request for a given channel is made by using a corresponding parameter as a probability of transmission; carrier detecting means for checking whether a channel is in a transmission state or not; collision detecting means for checking whether transmitted packets have collided against each other or not; means for continuously sending out a dummy packet to a channel for a predetermined time when there is a circuit connection request, but continuously sending out a dummy packet to another channel for a predetemined time when the collision detecting means detects that a last dummy packet has collided; means for retransmitting packets other than the dummy packet whose collision has been detected by the collision detecting means; and a calculating circuit responsive to the outputs of the carrier detecting means and the collision detecting means corresponding to respective channels for updating a plurality of parameters stored in the memory circuit, whereby circuit switching and packet switching coexist.

According to a modified embodiment of this invention, there is provided a packet communication system of a multiaccess type in which a single communication medium is commonly used and wherein the communication medium is divided into a plurality of channels, respective users observe the states of respective channels, and quantities of access to respective channels are controlled in accordance with observed information, characterized in that there are provided a memory circuit for storing a plurality of parameters corresponding to respective channels; means for transmitting a packet when a transmission request for a given channel is made, by using a corresponding parameter as a probability of transmission; carrier detecting means for checking whether a channel is in a transmission state or not; collision detecting means for checking whether transmitted packets have collided against each other or not; means for generating a setup packet when a circuit connection request is made; means for setting to "1" a parameter corresponding to a channel that receives the thus generated setup packet but setting to "0" a parameter corresponding to the received channel when the setup packet is received notwithstanding the fact that the origination setting packet is not produced; means for retransmitting packets whose collision has been detected by the collision detecting means; and a calculating circuit updating a plurality of parameters stored in the memory circuit in accordance with the outputs of the carrier detecting means and the collision detecting means corresponding to a respective channel, whereby circuit switching and packet switching coexist.

According to a still further modification of this invention, there is provided a packet communication system of a multiaccess type in which a single communication medium is commonly used and wherein the communication medium is divided into a plurality of channels, respective users observe states of respective channels, and the probability of packet transmission to respective channels is controlled in accordance with the observed information, characterized in that there are provided a memory circuit for storing a plurality of parameters correspondig to respective channels; means for transmitting a packet when a transmission request for a given channel is made, by using a corresponding parameter as probability of transmission; carrier detecting means for checking whether a channel is in a transmission state or not; collision detecting means for checking whether transmitted packets have collided against each other or not; means responsive to a circuit connection request to generate a setup packet, for continuously transmitting a dummy packet for a predetermined time to a channel at which the setup packet has been transmitted, when the collision detecting means fails to detect a collision of the setup packet; means for retransmitting packets other than the dummy packet whose collision has been detected by the collision detecting means; and a calculating circuit for updating a plurality of parameters stored in the memory circuit in accordance with the outputs of the carrier detecting means and the collision detecting means corresponding to respective channels, whereby circuit switching and packet switching coexist.

Each embodiment further comprises means for counting the number of "0" among a plurality of parameters stored in the memory circuit. This means rejects circuit connection when the counted number exceeds a predetermined value.

BRIEF DESCRIPTION OF THE DRAWINGS

In the accompanying drawings:

FIG. 18 is a block diagram showing a modification of the control circuit 111 shown in FIG. 14;

FIG. 19 is a block diagram showing a controller shown in FIG. 18;

DESCRIPTION OF THE PREFERRED EMBODIMENTS

Figure 1:
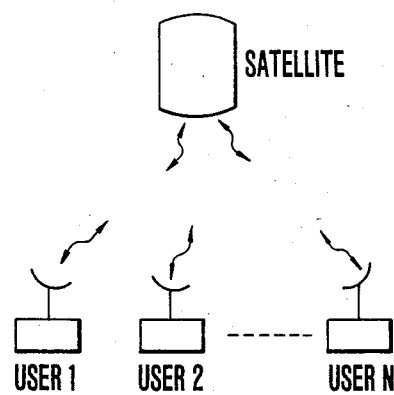
FIG. 1 is a diagrammatic representation showing satellite communication.
Figure 2:
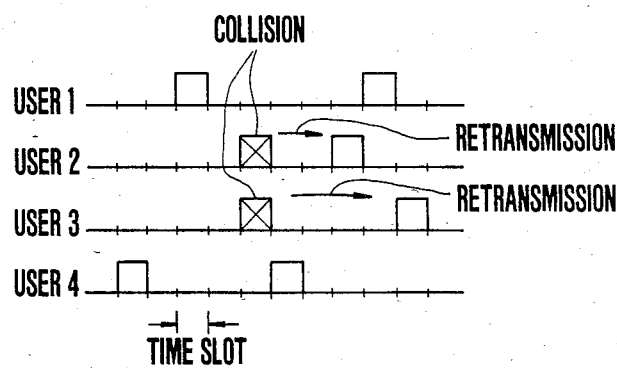
FIG. 2 is a diagram showing a slotted ALOHA system.
Figure 3:
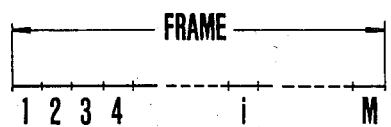
FIG. 3 is a diagrammatic representation of a frame.
Figure 4:
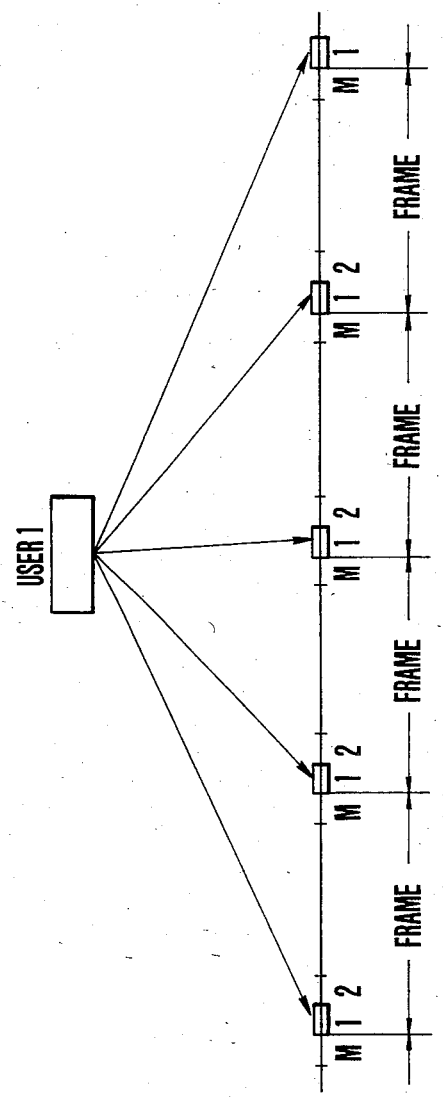
FIG. 4 is a diagram useful in explaining circuit connection carried out in circuit switching.

In the present invention, "circuit switching" is used to mean that a certain user exclusively uses, for circuit connection, a specified channel. For example, in an example shown in FIG. 4 wherein a communication medium is divided into a plurality of channels in the time domain, user 1 exclusively uses a first slot 1 in each frame.

A preferred embodiment of this invention wherein a plurality of channels are realized in time domain will now be described.

In an ordinary data communication, the system operates in the same manner as the conventional system. Thus, where a circuit connection request is made, a dummy packet is sent out continuously to a slot having a low utilization factor for a time $T_1$. Where the time $T_1$ is selected to satisfy a relation $T_1$ (frame) $> 1/\alpha$, as can be noted from the algorithm shown in equation (1), the parameters of other users corresponding to the channel become 0 (zero) after time $1/\alpha$, thus completely shutting out the other users from the slot. This state means that the circuit has been established. Thereafter, data or information packets are continuously sent out.

Figure 5:
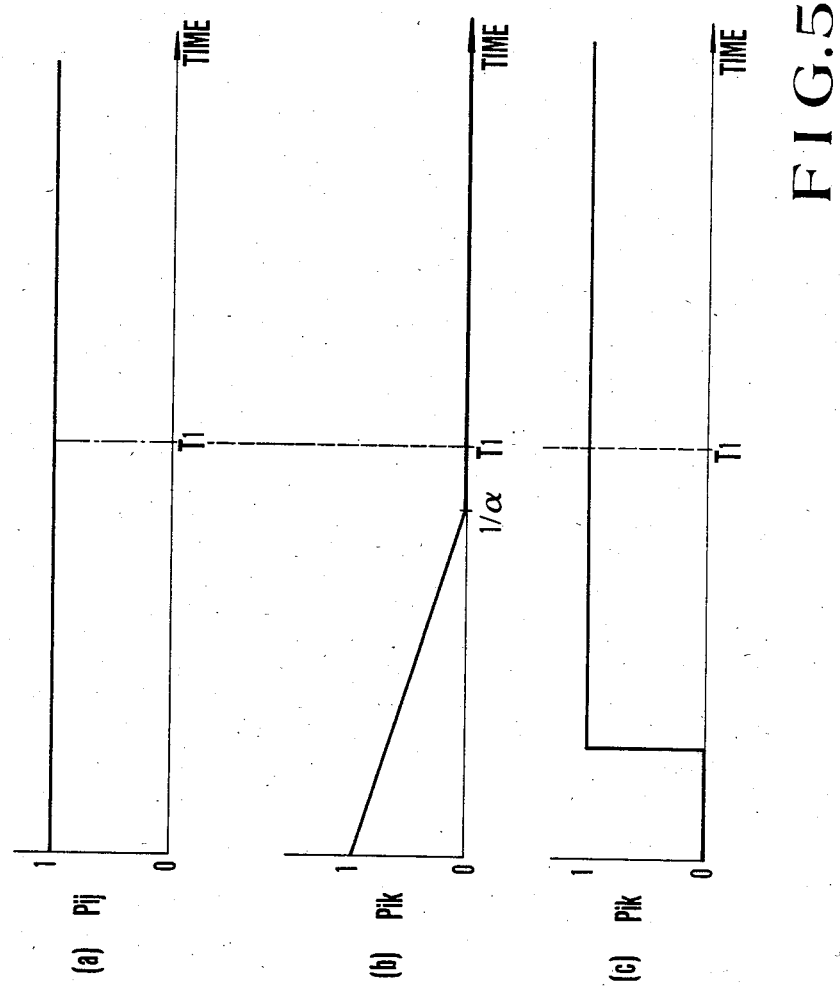
FIG. 5 is a time chart for explaining the principle of a packet communication system according to an embodiment of the invention.

For example, if a user j requests circuit connection at a time slot i, then the probability $P_{ij}$ of this user j is fixed to 1 (one) as shown at section (a) in FIG. 5 whereas because of continuous transmission of the dummy packet from the user j, the probability $P_{ik}$ (k=j) of the other users gradually decreases to fall to zero at a time $1/\alpha$ in accordance with the algorithm of equation (1) as shown at (b) in FIG. 5. Consequently, the user j can transmit the dummy packet until $T_1$ and transmit the data packet after $T_1$ without causing any collision. If other users may request circuit switching to the same i (in this case, the probability $P_{ik}$ changes to 1 (one) at a time prior to $T_1$ as shown at (c) in FIG. 5), the probability $P_{ij}$ of the user j falls to zero at time $T_1$ as depicted by phantom line at (a) in FIG. 5. In the case of conflict, the slot in which the conflict has occurred is released and the circuit connection is restarted at another slot. Then a user who has later establishes a circuit connection would monopolize the slot.

Figure 6:
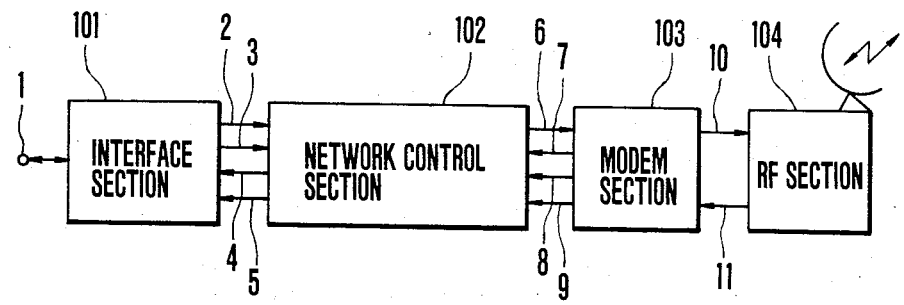
FIG. 6 is a block diagram showing the basic construction of the packet communication system embodying the invention.

A first embodiment will now be described. FIG. 6 shows the basic construction of a radio terminal unit. An input/output terminal 1 is connected to a data terminal unit or the like. An interface section 101 assembles into a packet the data sent from the data terminal unit via terminal 1 to send the packet to a succeeding network control section 102. The interface section 101 also decomposes a packet sent from the network control section 102 to send the decomposed packet to the data terminal unit through terminal 1. When a circuit connection request signal is received from the terminal unit, that signal is sent to the network control section 102. Thereafter, when a sent-out pulse is received from the network control section, the data from the terminal unit are assembled into a packet which is sent to the network control section 102. When the data is over, a release signal is sent to the network control section 102. The network control section 102 mainly performs an access control. A modem section 103 literally performs modulation and demodulation as will be described later in detail. A RF section 104 is provided for raising the frequency of the intermediate frequency signal (IF signal) sent from the modem section 103 to a transmission frequency radiated into air through an antenna. Furthermore, the RF section 104 decreases the high frequency of the received signal to the intermediate frequency which is sent to modem section 103.

Figure 7:
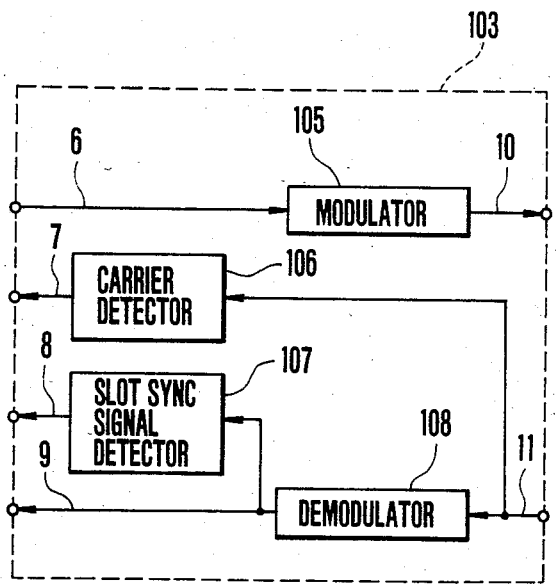
FIG. 7 is a block diagram showing a modem 103 utilized in FIG. 6.

FIG. 7 is a block diagram showing the modem section 103. A modulator 105 modulates a packet inputted through a signal line 6 and sends the modulated packet to the RF section 104 via signal line 10. A demodulator 108 demodulates a modulated signal inputted through signal line 11 to send the demodulated signal to the network control section 102 via signal line 9. A carrier detector 106 is provided to check whether the channel was in a transmission state or not. Thus, the carrier detector 106 detects signal power on line 11 and if it judges that there is a transmission state, when the power is higher than a threshold value, it sends a busy signal to the network control section 102 over a signal line 7, and if the power is lower than the threshold value, an empty signal is sent to the section 102. A slot synchronizing signal detector 107 extracts a slot synchronizing signal constantly flowing through a channel to send a synchronizing pulse to the network control section 102 over signal line 8.

Figure 8:
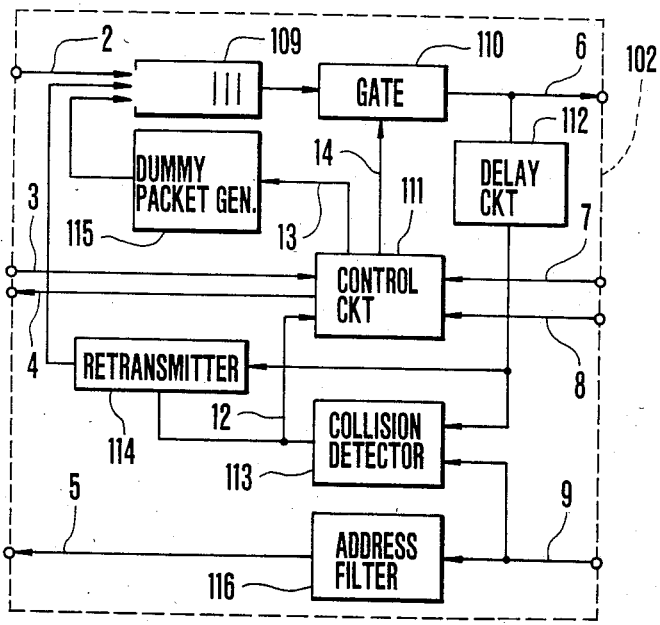
FIG. 8 is a block diagram showing a network control section 102 shown in FIG. 6.

FIG. 8 is a block diagram showing the network control section 102. A packet inputted over the signal line 2 is first stored in a buffer memory 109, and the packet is sent to the modem/section 103 over signal line 6 when a gate circuit 110 is enabled. The gate circuit 110 is enabled or disabled by a control signal sent from a control circuit 111. The packet sent out from the gate circuit 110 is transmitted over signal line 6 and at the same time, the packet is delayed by a propagation delay time (e.g. time interval of 0.27 sec between transmission and reception of a packet by a user) by a delay circuit 112 and then inputted into a collision detector 113. The purpose of the collision detector 113 is to judge whether a transmitted packet collides against a packet transmitted from another user at a channel, and compares the packet received via signal line 9 with the packet from the delay circuit 112. Upon coincidence, the collision detector 113 sends out a success signal but when a coincidence is not obtained, it sends out a collision signal. A retransmitter 114 takes in a packet from the delay circuit 112 other than a dummy packet to be described later. When the retransmitter 114 receives a collision signal from the collision detector 113, the packet is delayed according to a given distribution to return it to the buffer memory 109. Whereas when the success signal is received, that packet is removed. Each time a dummy packet generator 115 periodically receives from the control circuit 111 a signal for generation of a packet, the dummy packet generator 115 generates a dummy packet according to this signal, and the generated dummy packet is sent to the buffer memory 109. An address filter 116 takes in only a packet applied with its own address among packets received over signal line 9, and passes the packet to the interface section 101 over signal line 5. The control circuit 111 receives a busy signal or an empty signal through signal line 7, a slot synchronizing pulse through signal line 8, a success signal or a collision signal from the collision detector 113 and a circuit connection request signal and a release signal from signal line 3 for controlling the gate circuit 110 and dummy packet generator 115. Further, the control circuit 110 sends a transmission signal to the interface unit 101 over signal line 4.

Figure 9:
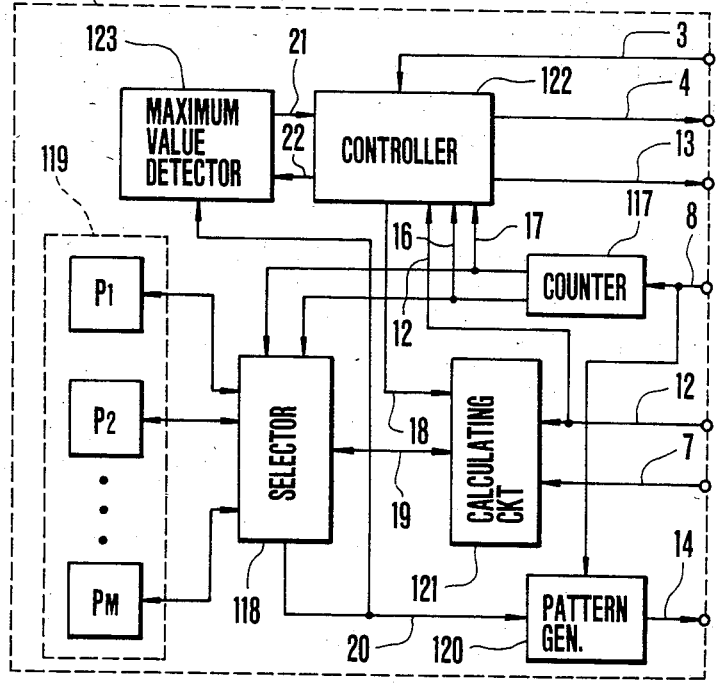
FIG. 9 is a block diagram showing a first example of a control circuit 111 shown in FIG. 8.

Referring to FIG. 9, details of the control circuit 111 will be described. More particularly, the control circuit 111 is supplied with a circuit connection request signal and a release signal from signal line 3, a slot synchronizing pulse from signal line 8, a success signal or a collision signal from signal line 12, and a busy signal or an empty signal from signal line 7, to send out a transmission signal on signal line 4, a pulse for controlling the dummy packet generator 115 on signal line 13, and a gate control signal controlling the operation of the gate circuit 110 on signal line 14. A counter 117 counts the number of the slot synchronizing pulses by utilizing M as a modulus to provide a value I (transmission slot number) and sends to a selector 118 a value I and a value I' (receiving slot number I') obtained by subtracting the number of slots of the propagation delay time from the value I by using M as the modulus.

Two slot numbers are necessary because as the propagation delay becomes large the transmitting slot and the receiving slot become different from each other. Selector 118 derives from a memory circuit 119 storing M parameters, parameter $P_I$ corresponding to a transmission slot number I and a parameter $P'_I$ corresponding to a receiving slot number I'. The derived parameter $P_I$ is sent to a pattern generator 120, while derived parameter $P_I'$ is sent to a calculating circuit 121. In the calculating circuit 121, parameter $P_I'$ is updated and returned to the selector 118 which returns the updated parameter $P_I'$ to the memory circuit 119. In the pattern generator 120, the parameter $P_I$ sent from selector 118 in synchronism with a slot synchronizing pulse from signal line 8 is used as a probability, and a control signal enabling the gate circuit 110 according to this probability is sent to the gate circuit through the signal line 14. A controller 122 effects the circuit connection during a time interval between reception of the circuit connection request signal and reception of a release signal from the signal line 3. A maximum value detector 123 compares parameters sent from selector 118 and determines which slot number of a parameter having the maximum value should be sent to controller 122 through signal line 21. When the maximum value detector 123 receives a reassignment request signal from signal line 22, it sends a slot number of a parameter having a value next to the maximum value to controller 122 over signal line 21.

Figure 10:
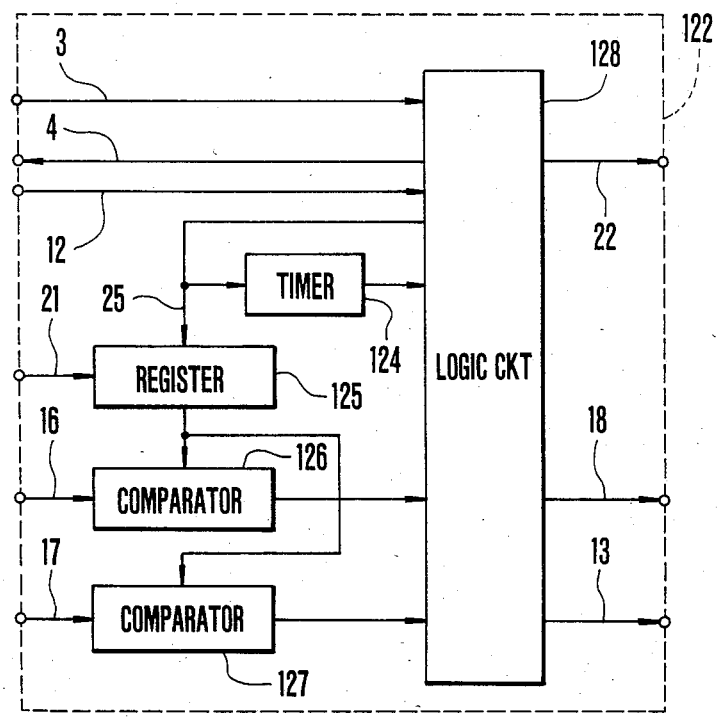
FIG. 10 is a block diagram showing a controller shown in FIG. 9.

FIG. 10 shows the block diagram of the controller 122. When supplied with a circuit connection request signal from line 3, a logic circuit 128 sends a pulse to a signal line 25 for actuating a timer 124 and stores in a register 125 a slot number sent from signal line 21 at that time. A comparator 126 is provided to compare the slot number stored in the register 125 with the received slot number sent from signal line 16. When both slot numbers coincide with each other, the comparator 126 produces a connection pulse. A comparator 127 compares the slot number stored in the register 125 with the transmission slot number from signal line 17. When a coincidence is obtained comparator 127 sends a dummy packet transmission pulse to the logic circuit 128. The timer 124 operates for a time $T_1$. While the timer 124 is operating, the logic circuit 128 sends the connection pulse from the comparator 126 over signal line 18, and sends the transmission pulse from the comparator 127 over signal line 13. When the operating time of the timer 124 is over and concurrently, a success signal is received from signal line 12 and the transmission pulse from the comparator 127 is sent on signal line 4. The register 125 is reset when it is supplied with a release signal from signal line 3, so as to stop sending-out of the transmission signal through signal line 4. If a dummy collision signal is received from signal line 12 when the time of the timer is over, a reassignment request signal is sent out through signal line 22 to execute again the operation executed when a circuit connection request signal is received.

Figure 11:
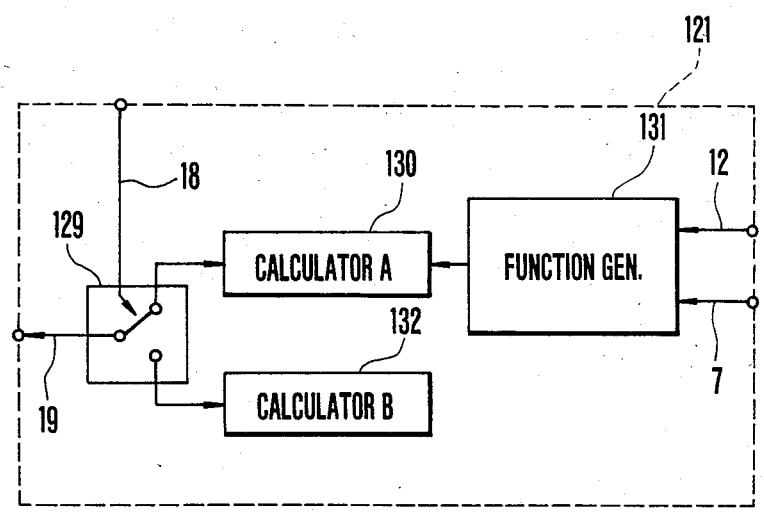
FIG. 11 is a block diagram showing a calculating circuit 121 shown in FIG. 9.

FIG. 11 shows a block diagram of the calculating circuit 121. Thus, a success signal or a collision signal is inputted to a function generator 131 through signal line 12 and a busy, signal or an empty signal is inputted to the function generator through signal line 7. The function generator 131 outputs a function value which is:

$$\delta = \begin{cases} 1 & \text{empty signal or success signal present} \\ -1 & \text{other cases} \end{cases}$$

When supplied with a parameter P through a switch 129, a calculator A 130 updates the parameter P in accordance with output $\delta$ from the function generator 131 in the following manner:

for $P + \alpha\delta < 0$, $P \leftarrow 0$;

for $0 \leq P + \alpha\delta \leq 1$, $P \leftarrow P + \alpha\delta$; and for $1 < P + \alpha\delta$, $P \leftarrow 1$.

The updated parameter P is returned to switch 129. The switch 129 normally connects the signal line 19 to calculator A130, but only when the connection pulse is supplied through signal line 18, the switch 129 is transferred so as to send a parameter being applied through the signal line 19 at that time to a calculator B 132 which sets the received parameter to "1" and then returns it immediately.

In the first embodiment described above, when the number of users establishing the circuit connection increases, all slots will be occupied by these users so that users which have been engaged in normal data communication will be shut out.

Figure 12:
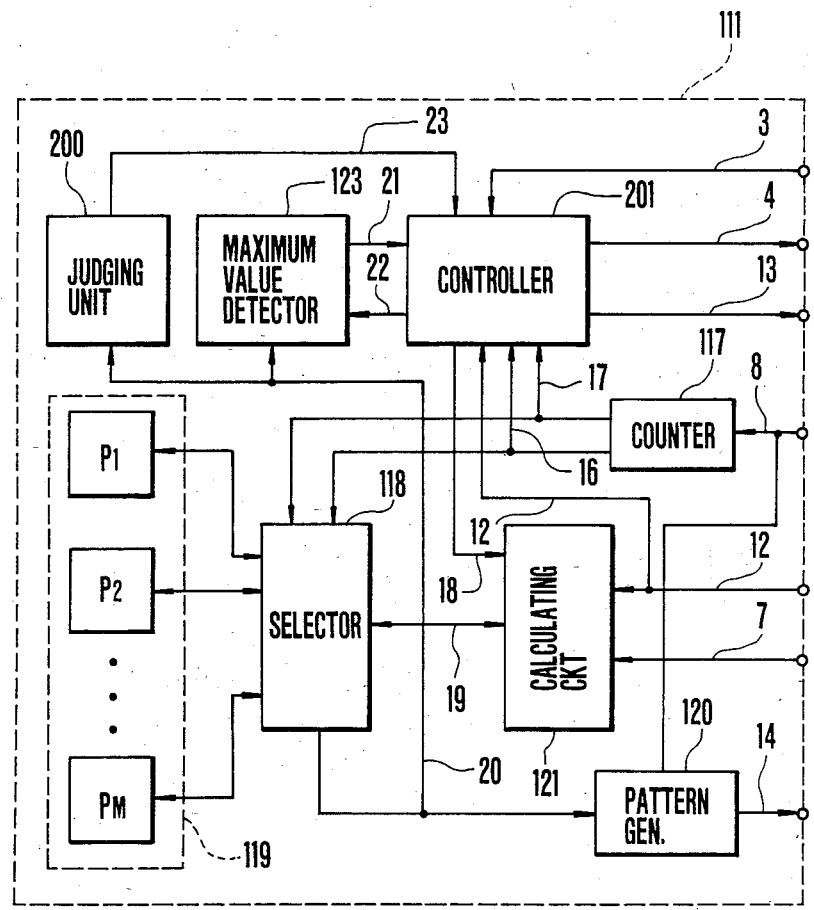
FIG. 12 is a block diagram showing a second example of the control circuit 111 shown in FIG. 8.
Figure 13:
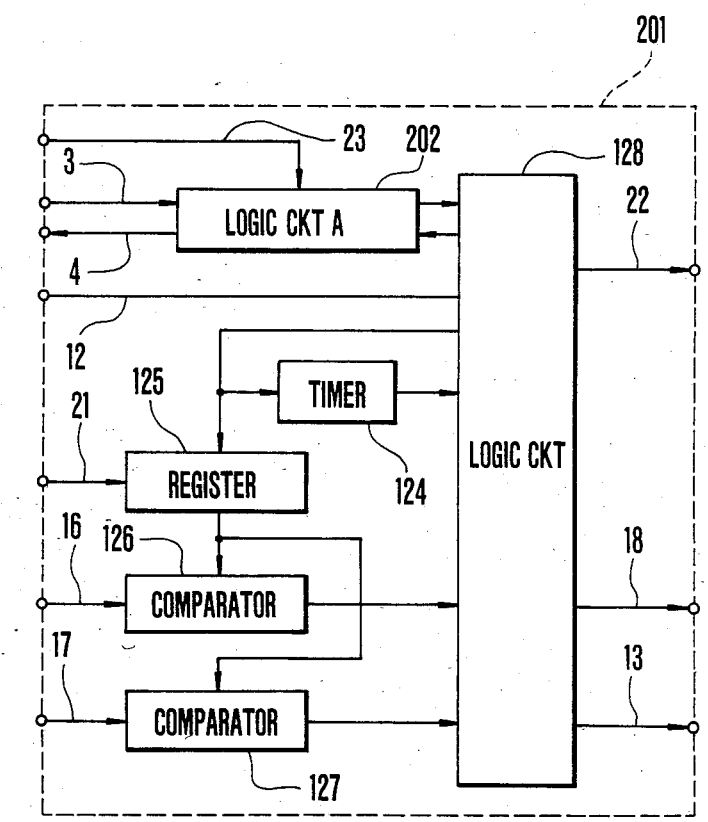
FIG. 13 is a block diagram showing a controller shown in FIG. 12.

In the following second embodiment, each user checks the number of slots subject to the circuit connection by observing the parameter and rejects the circuit connection when the number exceeds predetermined value. Thus, the number of slots under the circuit connection is limited to prevent shutting-off of normal data communication. The second embodiment will now be described in detail. Thus, FIG. 12 shows a second embodiment of the network control section 102, which is different from the first embodiment shown in FIG. 9 in that a judging unit 200 has been added and that a controller 201 is slightly modified correspondingly. More particularly, the judging unit 200 counts the number of parameters of 0 among M parameters sequentially sent form the selector 118. When the counted number exceeds a preset number $M_o$, the judging unit 200 sends a connection disabling signal to the controller 201 through a signal line 23. FIG. 13 shows the modified controller 201 which is different from the controller 122 of the first embodiment shown in FIG. 10 in that a logic circuit A202 has been added. Normally, the logic circuit A202 merely interconnects signal lines 3 and 4 and logic circuit 128, but when a connection disabling signal is inputted from signal line 23, it disconnects signal lines 3 and 4 from the logic circuit 128, whereas when a circuit connection request signal is inputted through signal line 3, the logic circuit A202 sends back the connection disabling signal through signal line 4.

As described above, according to this invention, a composite switching can be readily realized by a distributed control wherein channel assignment is made in circuit switching for data requiring immediate transmission, but for other channels random accesses are made. While, in the foregoing embodiments, time is divided into a plurality of channels, this invention may also be applicable to division of frequency into a plurality of channels. A modification of this invention in which a setup packet is sent for data requiring an immediate transmission will now be described.

In this modification, a specified packet called herein "setup packet" is employed for circuit connection and each user has ability to discriminate the setup packet from the normally used packet. Upon the transmission of the setup setting packet in a slot, it is known by each user that another user is transmitting the setup packet at that time slot. Of course, the user transmitting the setup packet knows of his own transmission of the setup packet. It will be appreciated that this modification is not based on the algorithm of equation (1).

Thus, in the case of data communication, the same operation as the conventional system is made, and where there is a circuit connection request, a setup packet is sent out like an ordinary data packet. Each user judges whether the received packet is setup packet or not, and if the setup packets sent out from respective users do not collide with each other, the parameters corresponding to channels at which the origination setting packets have been sent are set to "1", thus starting transmission at such channels. When a packet is an origination setting packet sent from another, the parameters corresponding to received channels are set to "0". By the measure described above, a circuit connection is established.

Figure 14:
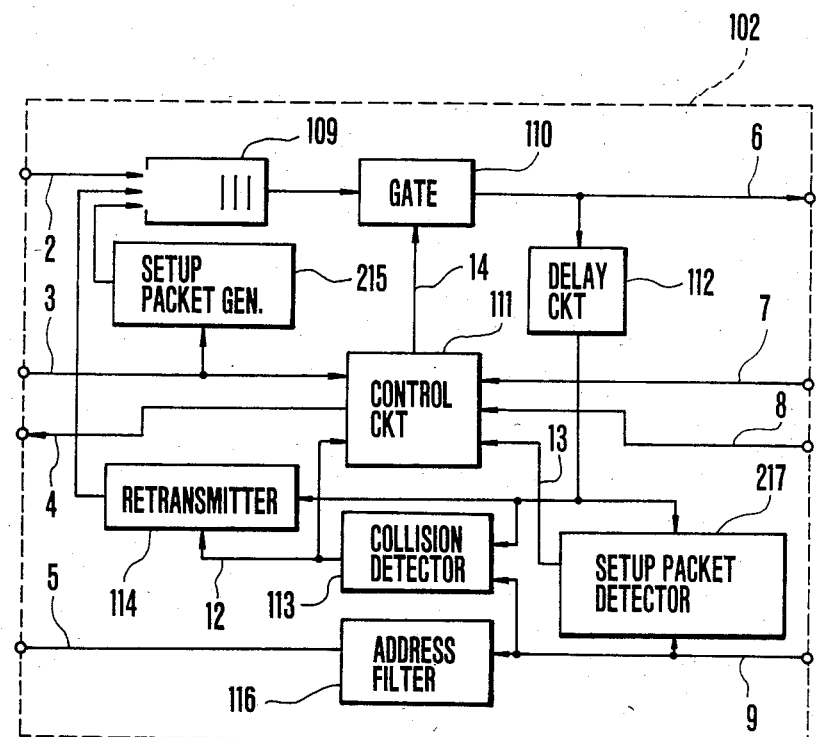
FIG. 14 is a block diagram showing a modified network control section 102 shown in FIG. 6.

FIG. 14 is similar to FIG. 8 except that instead of the dummy packet generator, a setup packet generator 215 and a setup packet detector 217 are provided.

The construction and operation of the network control section 102 utilized in this modification will now be described in detail with reference to FIG. 14. But the same construction and operation as those in FIG. 8 will not be described herein. The packet outputted by the gate circuit 110 is transmitted through signal line 6 and at the same time delayed by a propagation delay time by means of the delay circuit 111 and then applied to the collision detector 113 and a setup packet detector 217. Upon receipt of a circuit connection request signal from terminal 3, the setup packet generator 215 generates a setup packet which is sent to the buffer memory 109. The setup packet detector 217 judges whether the transmitted packet and the received packet are the setup packets or not. When both packets are the setup packets, a setup signal is sent to the control circuit 111 whereas when only the received packet is the setup packet, a setup receiving signal is sent to the control circuit 111.

Figure 15:
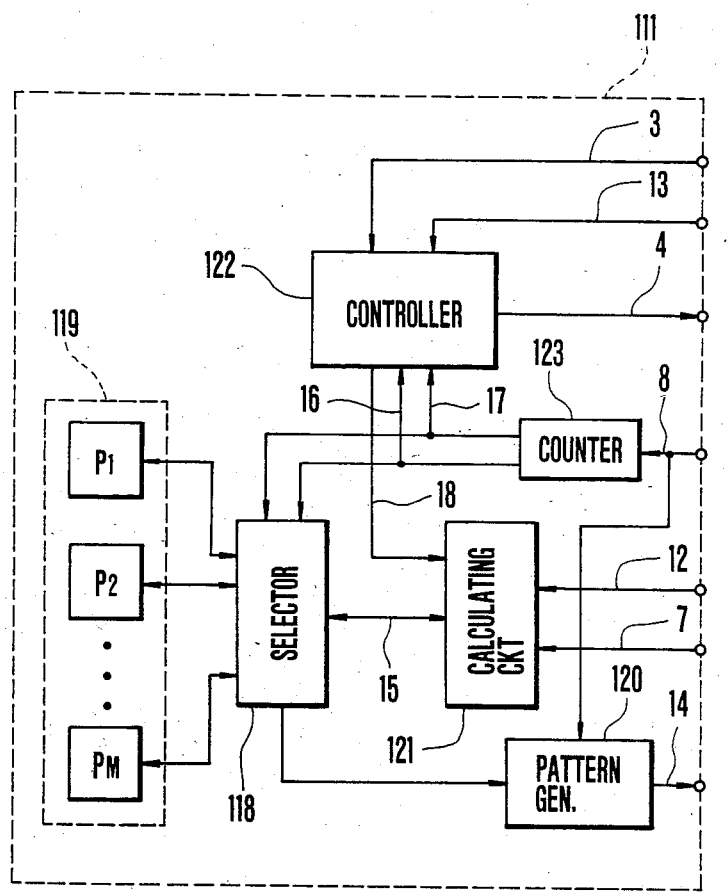
FIG. 15 is a block diagram showing a control circuit 111 shown in FIG. 14.

The control circuit 111 of FIG. 14 is detailed in FIG. 15. The controller 122 is supplied with a setup signal or a setup receiving signal on line 13.

Figure 16:
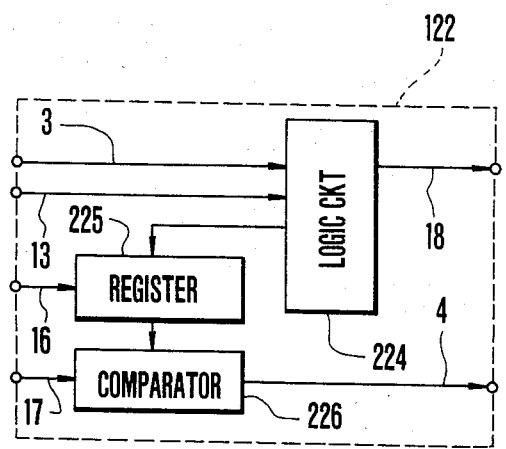
FIG. 16 is a block diagram showing a controller shown in FIG. 15.

FIG. 16 is a block diagram showing the controller 122 shown in FIG. 15. Thus, a logic circuit 224 receives a circuit connection request signal and a release signal from signal line 3, a setup signal or a setup signal from signal line 13, a receiving slot number from signal line 16, and a transmission slot number from signal line 17 for outputting a signal for controlling the calculating circuit 121 over signal line 18, and a tansmission pulse over signal line 4. Upon receipt of a setup receiving signal from signal line 13, the logic circuit 224 transmits a circuit open signal over signal line 18 and receives a circuit request signal from signal line 3. Thereafter, when the logic circuits 224 receives a setup signal from signal line 13, it sends a circuit connection setting signal to the calculating circuit 121 via signal line 18. At the same time, a register 225 stores a receiving slot number received from signal line 16 at this time. A comparator 226 is provided for comparing a slot number stored in the register 225 with a transmission slot number from a signal line 17. When these slot numbers coincide with each other, a transmission pulse is sent out over signal line 4. When a release signal is received from signal line 3, the register 225 is reset to stop sending out the transmission pulse through signal line 4.

Figure 17:
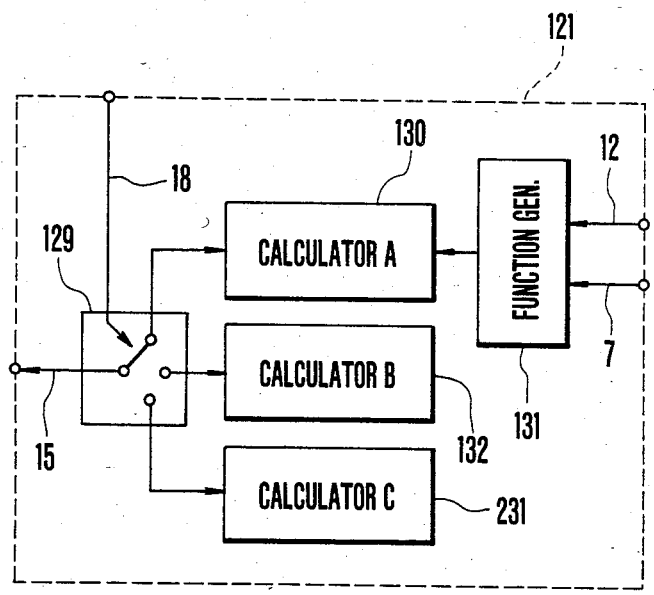
FIG. 17 is a block diagram showing a calculating circuit 121 shown in FIG. 15.

FIG. 17 is a block diagram showing the calculating circuit 121 shown in FIG. 15. As will be seen from comparison of FIG. 17 with FIG. 11, a calculator C 231 is added in FIG. 17. When the circuit open signal is received from the signal line 18, the switch 129 which is normally transferred to connect to the calculator A 130 as described previously is transferred for sending a parameter received from signal line 15 to a calculator C 231 which sets the incoming parameter to "0" and returns it immediately. Thereafter, the switch 129 is transferred to connect it to the calculator A 128.

The judging unit 200 shown in FIG. 12 can be provided in the control circuit 111 of FIG. 15, as illustrated in FIG. 18. Correspondingly, the controller 201 has the logic circuit A 202 as shown in FIG. 19.

In still another modification, for data requiring immediate transmission, a setup packet is transmitted and thereafter a dummy packet is continuously transmitted on channels in which the setup packet is successful. In this modification, time $T_1$ mentioned previously can be $T_1 > 1/\alpha$ because the origination setting packet and the dummy packet are used in combination.

Normally, in the case of data transmission, the same operation as that of the conventional system is made, but when a circuit connection request is received, a setup packet is first sent out in the same manner as an ordinary data packet. When the transmission of the setup packet is successful at a slot, a dummy packet is continuously sent at the successful slot for time $T_1$. Where the time $T_1$ is selected to satisfy a relation $T_1$ (frame)>1/α (α represents a correction coefficient), as can be noted from the algorithm of equation (1), after the time $T_1$, the parameters of other users corresponding to that slot becomes 0 (zero) after the time $T_1$, thus completely shutting off the other users. This state means that a circuit connection has been established. Thereafter, the data packets are continuously sent out.

In this case too, the radio unit and the modem shown in FIGS. 6 and 7 respectively are used.

Figure 20:
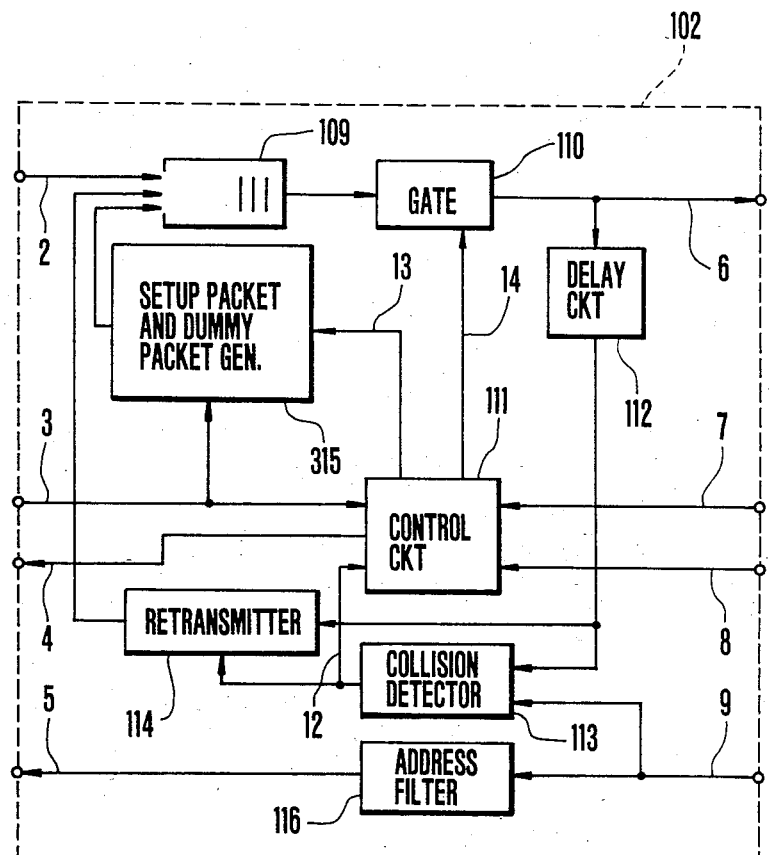
FIG. 20 is a block diagram showing a modified network control section 102 shown in FIG. 6.

Referring to FIG. 20, the network control section 102 utilized in this modification is similar to that shown in FIG. 14 except that the setup packet detector 217 has been omitted, so that only the elements operating differently will be described.

When supplied with a circuit connection request signal from terminal 3, a setup packet and dummy packet generator 315 generates a setup packet which is sent to the buffer memory 109. Thereafter, when packet generation signals are periodically supplied from the control circuit 111, the setup packet and dummy packet generator 315 generates a setup packet and dummy packets according to the packet generation signals and the setup packet and the generated dummy packet are set to the buffer memory 109.

Figure 21:
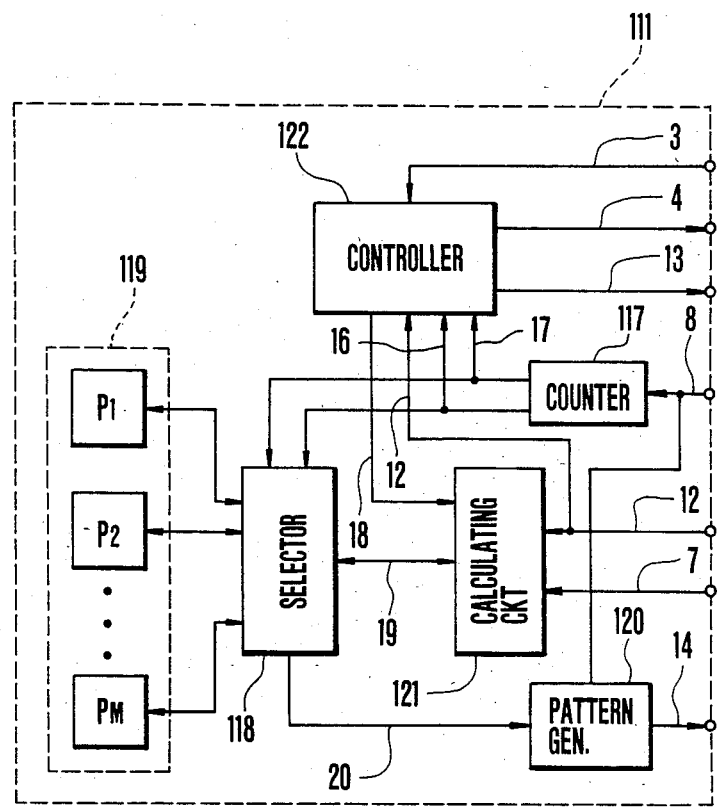
FIG. 21 is a block diagram showing a control circuit 111 shown in FIG. 20.

The control circuit 111 utilized in this modification is shown in FIG. 21. This control circuit 111 is identical to that shown in FIG. 9 by eliminating the maximum value detector 123.

Figure 22:
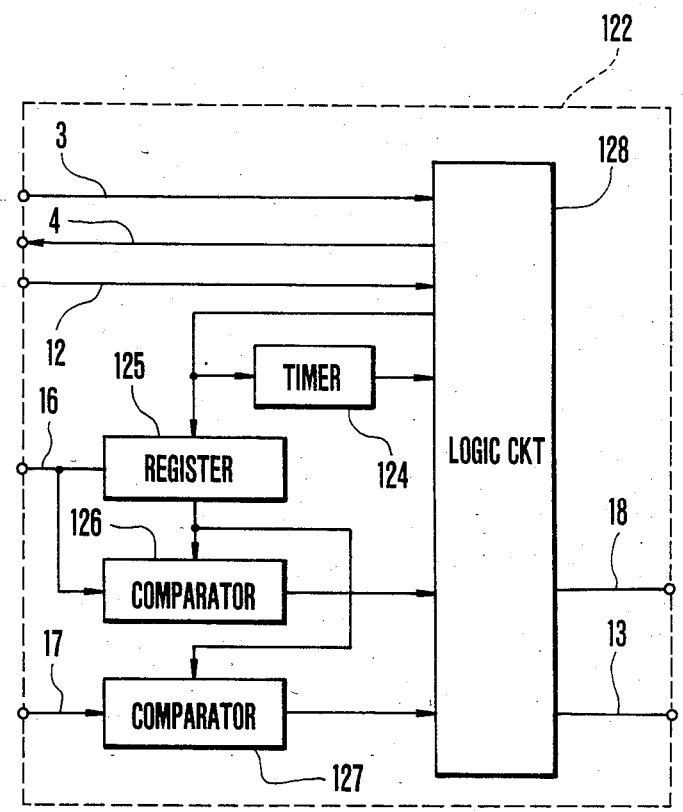
FIG. 22 is a block diagram showing a controller shown in FIG. 21.

The controller 122 utilized in this modification and shown in FIG. 22 has a slightly different construction from that shown in FIG. 10. More particularly, the logic circuit 128 is supplied with a circuit connection request signal and a release signal from signal line 3, a success signal or a collision signal from signal line 12, a receiving slot signal from signal line 16, and a transmitting slot number from signal line 17 for outputting a signal controllng the calculation circuit 121 on a signal line 18, a transmission pulse on a signal line 4, and a setup packet generating pulse on signal line 13. When supplied with the circuit connection request signal from signal line 3 and thereafter with the success signal from signal line 12, the logic circuit 128 actuates the timer 124 and causes the register 125 to store the received slot number from signal line 16 at that time. The comparator 126 compares the slot number stored in the register 125 with the received slot number from signal line 16. When both slot numbers coincide with each other, the comparator produces a connection pulse which is supplied to the logic circuit 128. Another comparator 127 compares the slot number stored in the register 125 with the transmission slot number from signal line 17 and when these slot numbers coincide with each other, the comparator 127 sends a transmission signal to the logic circuit 128. The timer 124 operates for time $T_1$ in a frame unit which is $T_1 > 1/\alpha$. While the timer 124 is operating, the logic circuit 128 sends a connection pulse from the comparator 126 through signal line 18, and a transmission pulse signal from the comparator 127 through signal line 13. When the time of the timer 124 is over, the transmission pulse from the comparator 127 is sent through signal line 4. When supplied with a release signal from signal line 3, the logic circuit resets the register 125 to stop sending out the transmission pulse through signal line 4.

The calculating circuit 121 utilized in this embodiment has the same construction as that shown in FIG. 11.

Figure 23:
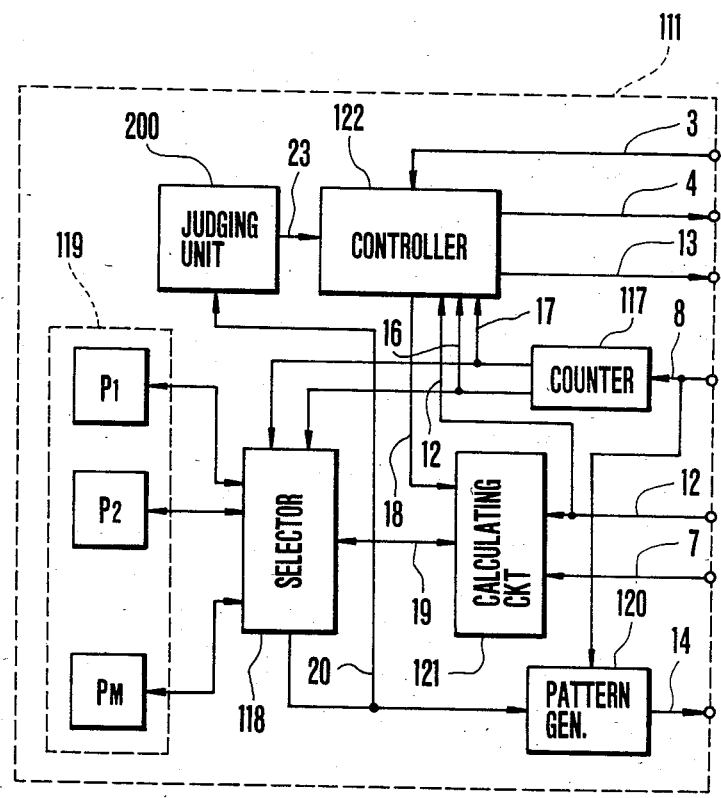
FIG. 23 is a block diagram showing a modification of the control circuit 111 shown in FIG. 20.
Figure 24:
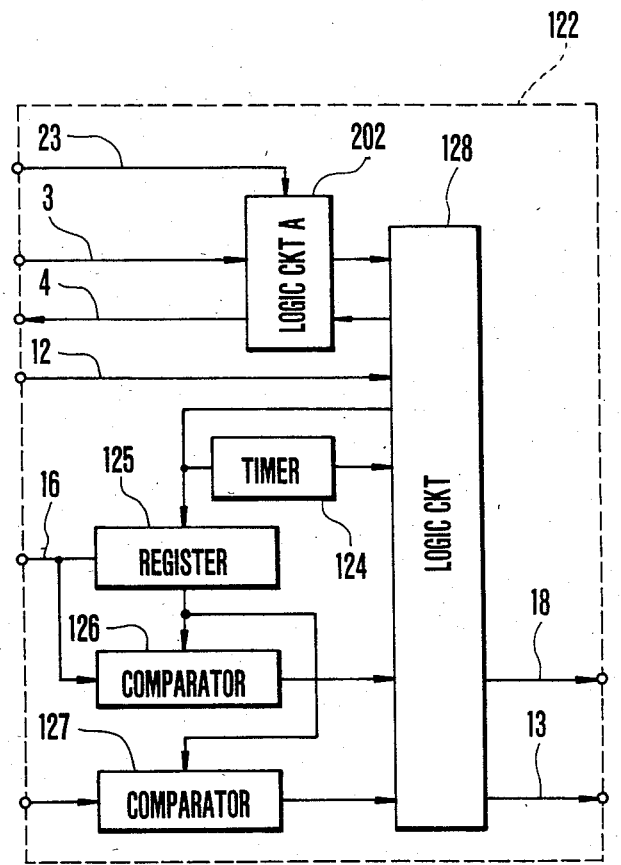
FIG. 24 is a block diagram showing a modification of the controller 122.

For the purpose of preventing shutting off other users in a manner as has been pointed out before, a control circuit 111 shown in FIG. 23 is used. This control circuit 111 is similar to that shown in FIG. 21 except that a judging unit 200 is added with the result that the controller 122 is slightly modified as shown in FIG. 24.

What is claimed is:

1. In a packet communication system of a multiacess type in which a single communication medium is commonly used and wherein said communication medium is divided into a plurality of channels, respective users observe states of use of respective channels, and the probability of packet transmission to respective channels is controlled in accordance with observed information, the improvement comprising:

a memory circuit for storing a plurality of parameters, each corresponding to a respective channel;

means for transmitting a packet when a transmission request for a given channel is made, by using said corresponding parameter of the channel as the probability of packet transmission;

carrier detecting means for checking whether a channel is in a transmission state or not;

collision detecting jeans for checkng whether transmitted packets have collided against each other or not;

means for continuously sending out a dummy packet to a channel for a predetermined time after a circuit connection is made, delivering out a connection completion signal when the results of a check made by said collision detecting means indicates that the last dummy packet has not collided and again sending out a dummy packet to another channel for a predetermined time when said result indicates that a last dummy packet has collided;

means for retransmitting packets other than said dummy packet whose collision has been detected by said collision detecting means; and a calculating circuit responsive to outputs of said carrier detecting means and said collision detecting means corresponding to responsive channels for updating a plurality of parameters stored in said memory circuit, whereby circuit switching and packet switching coexist.

2. The packet communication system according to claim 1 further comprising means for counting the number of "0" among a plurality of parameters stored in said memory circuit, and for rejecting a circuit connection when a counted number exceeds a predetermined value.

3. In a packet communication system of a multiaccess type in which a single communication medium is commonly used and wherein said communication medium is divided into a plurality of channels, respective users observe states of respective channels, and the probability of packet transmission to respective channels is controlled in accordance with observed information, the improvement comprising:

a memory circuit for storing a plurality of parameters, each corresponding to a respective channel;

means for transmitting a packet when a transmission request for a given channel is made, by using a corresponding parameter of the channel as the probability of packet transmission;

carrier detecting means for checking whether a channel is in a transmission state or not;

collision detecting means for checking whether transmitting packets have collided against each other or not;

means for generating a setup packet when a circuit connection request is made;

means for setting to "1" a parameter corresponding to a channel that receives the thus generated setup packets but setting to "0" a parameter corresponding to the received channel when the setup packet is received notwithstanding the fact that the setup packet was not produced;

means for retransmitting packets whose collision has been detected by said collision detecting means; and a calculating circuit updating a plurality of parameters stored in said memory circuit in accordance with outputs of said carrier detecting means and said collision detecting means coresponding to respective channels, whereby circuit switching and packet switching coexist.

4. The packet communication system according to claim 3 further comprising means counting the number of "0" among a plurality of parameters stored in said memory circuit, and for rejecting circuit connection when a counted number exceed a predetermined value.

5. In a packet communication system of a multiaccess type in which a single communication medium is commonly used and wherein said communication medium is divided into a plurality of channels, respective users observe states of use of respective channels, and the probability of packet transmission to respective channels is controlled in accordance with the observed information, the improvement comprising:

a memory circuit for storing a plurality of parameters, each corresponding to a respective channel;

means for transmitting a packet when a transmission request for a given channel is made, by using a corresponding parameter of the channel as the probability of packet transmission;

carrier detecting means for checking whether a channel is in a transmission state or not;

collision detecting means for checking whether transmitted packets have collided against each other or not;

means responsive to a circuit connection request to generate setup packet, for continuously transmitting a dummy packet for a predetermined time in a channel in which said setup packet has been transmitted, when said collision detecting means fails to detect a collision of said origination setting packet and means for retransmitting packets other than said dummy packet whose collision has been detected by said collision detecting means; and a calculating circuit for updating a plurality of parameters stored in said memory circuit in accordance with outputs of said carrier detecting means and said collision detecting means corresponding to respective channels, whereby circuit switching and packet switching coexist.

6. The packet communication system according to claim 5 further comprising means counting the number of "0" among a plurality of parameters stored in said memory circuit, and for rejecting line connection when a counted number exceeds a predetermined value.

* * * * *